(12) United States Patent
Gladstein et al.

(10) Patent No.: US 6,456,972 B1
(45) Date of Patent: Sep. 24, 2002

(54) USER INTERFACE FOR SPEECH RECOGNITION SYSTEM GRAMMARS

(75) Inventors: Brian Gladstein; Rafael Baptista, both of Arlington; John Armstrong, III, Cambridge; Brian Wilson, Arlington, all of MA (US)

(73) Assignee: ScanSoft, Inc., Peabody, MA (US)

( * ) Notice: Subject to any disclaimer, the term of this patent is extended or adjusted under 35 U.S.C. 154(b) by 0 days.

(21) Appl. No.: 09/410,213

(22) Filed: Sep. 30, 1999

Related U.S. Application Data

(60) Provisional application No. 60/102,500, filed on Sep. 30, 1998.

(51) Int. Cl.[7] .............................................. G10L 15/18
(52) U.S. Cl. ........................................ 704/257; 704/275
(58) Field of Search ............................... 704/200, 270, 704/272, 275, 276, 257, 9, 10, 251, 252, 255

(56) References Cited

U.S. PATENT DOCUMENTS

| | | | |
|---|---|---|---|
| 5,774,628 A | * | 6/1998 | Hemphill .................... 704/255 |
| 5,812,977 A | | 9/1998 | Douglas ...................... 704/275 |
| 5,890,122 A | * | 3/1999 | Van Kleeck et al. ......... 704/275 |
| 5,937,385 A | * | 8/1999 | Zadrozny et al. ............ 704/251 |
| 5,983,190 A | * | 11/1999 | Trower, II et al. ........... 704/276 |
| 6,064,961 A | * | 5/2000 | Hanson ...................... 704/260 |
| 6,094,635 A | * | 7/2000 | Scholz et al. ................ 704/270 |
| 6,178,404 B1 | * | 1/2001 | Hambleton et al. .......... 704/275 |
| 6,188,985 B1 | * | 2/2001 | Thrift et al. ................. 704/275 |
| 6,208,971 B1 | * | 3/2001 | Bellegarda et al. .......... 704/275 |
| 6,208,972 B1 | * | 3/2001 | Grant et al. ................. 704/231 |

FOREIGN PATENT DOCUMENTS

| | | |
|---|---|---|
| DE | 195 33 541 C1 | 3/1997 |
| JP | 08044384 | 2/1996 |

* cited by examiner

*Primary Examiner*—Richemond Dorvil
(74) *Attorney, Agent, or Firm*—Bromberg & Sunstein LLP

(57) ABSTRACT

A graphical user interface allows a speech recognition system user to browse available grammars and their topics. A dialog box interface displays the currently active grammar, grammar searching mode, and a current input. A list of valid word phrases of at least one word also is generated and displayed. Using the interface, a user additionally may select an active grammar and a method of searching and displaying valid examples from the grammar based on the current input.

24 Claims, 1 Drawing Sheet

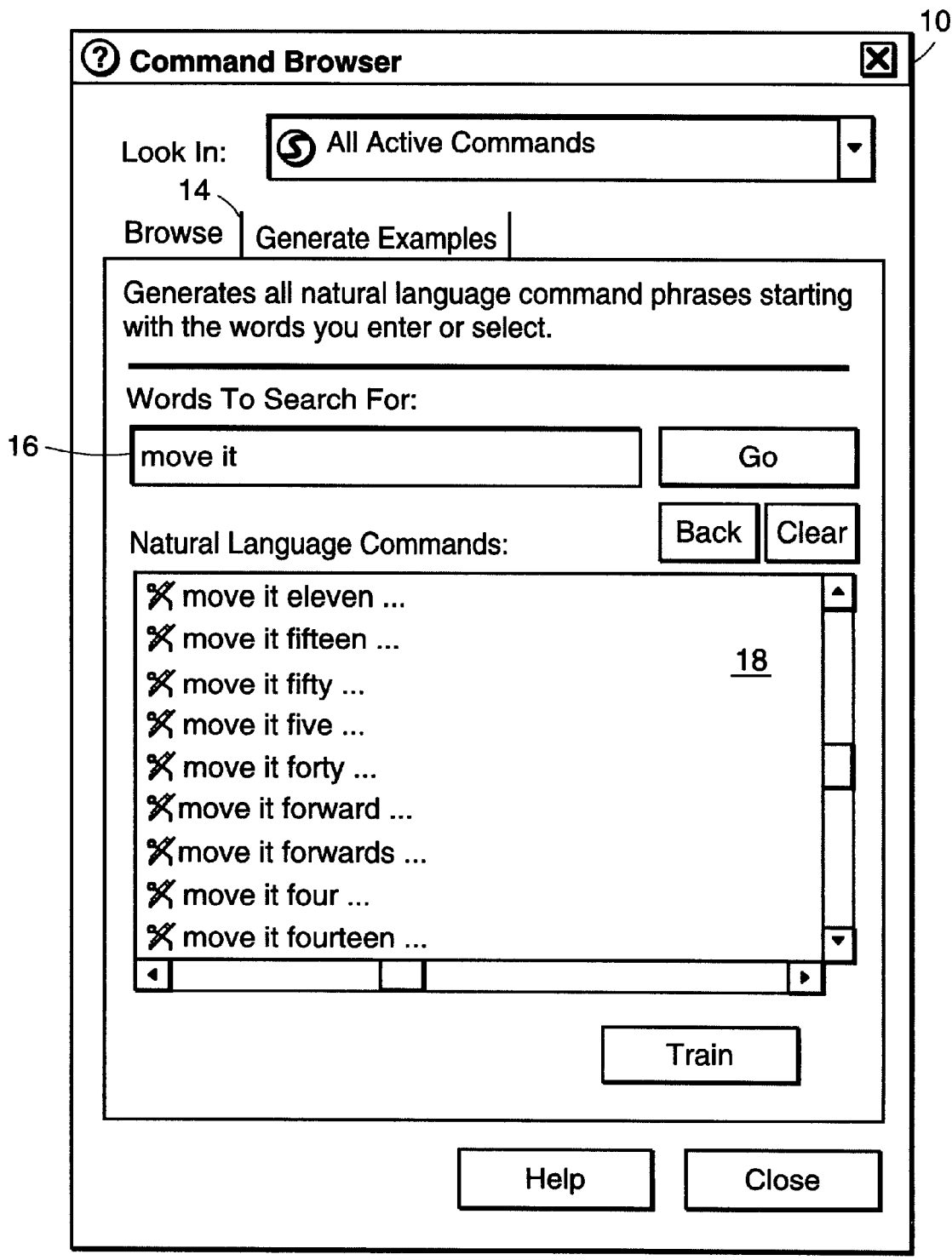

USER INTERFACE FOR SPEECH RECOGNITION SYSTEM GRAMMARS

The present application claims priority from U.S. provisional application No. 60/102,500, filed Sep. 30, 1998, which is hereby incorporated herein by reference.

TECHNICAL FIELD

The present invention relates to speech recognition systems, and more particularly, to a graphical user interface for interacting with multiple application-associated grammars.

BACKGROUND ART

A computer operating system graphical user interface allows a user to control multiple applications by manually operating a pointing device to position a cursor over application-associated icons. The pointing device is also employed within a specific application to control operation of the application, typically by drop-down menus and dialog boxes.

Speech recognition systems may also perform such application control by spoken input rather than manually operated pointing device. Multiple computer applications may be registered with a speech recognition engine, e.g., word processing, e-mail, etc. Each such application may have an associated grammar of valid vocabulary and usage. These grammars vary in their complexity. A grammar may be as simple as a list of command words such as "open," "close," "save," "print," etc. Such a simple grammar may also be visually displayed to a user in the familiar structure of drop-down menus. More sophisticated grammars emulate natural language usage and may parse complex phrases such as: "Italicize the first paragraph."

A grammar is properly viewed as the specification of word sequence structures permitted in a given language or application. The most common kinds of grammars are known as context-free grammars (CFGs) which contain a set of terminal symbols that appear in final sequences (e.g., words and punctuation), a set of non-terminal symbols that are expanded into other symbols (e.g., "NP" for a noun phrase, "VP" for a verb phrase), a specific non-terminal designated as the starting symbol (e.g., "s-maj", for major sentence), and a set of rewrite rules each of which has a single non-terminal symbol on the left-hand side (LHS) and one or more symbols on the right-hand side (RHS). A context-free grammar thus assigns one or more structures to every valid word sequence in a language.

Context-free grammars are often presented in Backus-Naur Form (BNF) notation. In BNF, non-terminal symbols are enclosed in <brackets> and the LHS and RHS of a rewrite rule are separated by an indicator symbol '::=' which may be read as "includes". In an example of a simple grammar:

<SENTENCE>::=<SUBJECT><VERBPHRASE>
    <SUBJECT>::=John|Mary
    <VERBPHRASE>::=<VERB><OBJECT>
    <VERB>::=eats|drinks
    <OBJECTS>::=wine|cheese A speech recognition system user may have some difficulty operating multiple applications by spoken command when each application has its own different associated grammar of valid vocabulary and usage. As a result, at any given instant, such a user may not know what commands may be spoken and recognized by a given application.

SUMMARY OF THE INVENTION

A preferred embodiment of the present invention provides a graphical user interface of a speech recognition system for user interaction with at least one grammar of valid vocabulary and usage for an application which is accessible to the speech recognition system. The interface includes an interactive dialog box in a portion of a display screen, a grammar identifier displayed within the dialog box which describes an active grammar, a search identifier displayed within the dialog box which describes a grammar search mode for determining valid inputs according to the active grammar, a current input displayed within the dialog box which describes a spoken input, and a valid grammar list displayed within the dialog box which lists examples of valid vocabulary and usage according to the grammar search mode for the active grammar. The dialog box may further include an active grammar display within the dialog box which displays the active grammar, and which may be used to interactively select the current input.

In a further embodiment, the active grammar or the grammar search mode, or both are interactively selectable using the dialog box. Similarly, one of the examples displayed in the valid grammar list may be interactively selectable as an input to the application of the active grammar.

In addition, or alternatively, the grammar search mode may determine all word phrases of at least one word which are valid in the active grammar, or word phrases of at least one word which contain the current input and which are valid in the active grammar. Such word phrases may be further constrained to start with the current input.

A preferred embodiment may also bias towards shortness the examples displayed in the valid grammar list by use of a matrix-based algorithm. For example, the matrix-based algorithm may determine an average generated example length to bias the examples towards shortness.

A preferred embodiment also includes a method of user interaction via a graphical user interface with at least one grammar of valid vocabulary and usage for an application accessible to a speech recognition system. The method includes creating an interactive dialog box in a portion of a display screen; displaying within the dialog box a grammar identifier which describes an active grammar, a search identifier which describes a grammar searching mode for determining valid inputs according to the active grammar, and a current input which describes a spoken input; and generating and displaying within the dialog box a valid grammar list which lists examples of valid vocabulary and usage according to the grammar search mode for the active grammar. The dialog box may further include an active grammar display within the dialog box which displays the active grammar, and which may be used to interactively select the current input.

In a further embodiment, the active grammar or the grammar search mode, or both, are interactively selected using the dialog box. Similarly, one of the examples displayed in the valid grammar list may be selected as an input to the application of the active grammar.

In addition, or alternatively, the grammar search mode may determine all word phrases of at least one word which are valid in the active grammar, or word phrases of at least one word which contain the current input and which are valid in the active grammar. Such word phrases may be further constrained to start with the current input.

A preferred embodiment may also bias towards shortness the examples displayed in the valid grammar list by use of a matrix-based algorithm. For example, the matrix-based algorithm may determine an average generated example length to bias the examples towards shortness.

BRIEF DESCRIPTION OF THE DRAWINGS

The present invention will be more readily understood by reference to the following detailed description taken with the accompanying drawings, in which:

FIG. 1 illustrates a graphical user interface of a speech recognition system according to a preferred embodiment of the present invention.

DETAILED DESCRIPTION OF SPECIFIC EMBODIMENTS

For each application registered with a speech recognition system, the total allowable vocabulary at any given moment is referred to as "the active grammar," or more simply, "the grammar." As used herein, "grammar" is shorthand for a more specific form of a factored BNF grammar wherein rewrite rules always have a single non-terminal symbol on the LHS and a sequence of symbols (terminal, non-terminal, or both) on the RHS, and wherein there are no other "special" symbols such as Booleans or punctuation.

Each grammar has the ability to divide itself into "topics." A topic is a non-terminal symbol in a grammar whose parent is also a topic, such as is well-known in the art. The start symbol of a grammar is by definition a topic, and thus, all grammars must have at least one topic.

The idea of topics is to define rules in the grammar that map to understandable areas of functionality that the language covers. For a simple calculator example:

Start→Addition|
    Subtraction|
    Multiplication|
    Division|
    Compute

Addition→"Add" Num AddAnd Num

Subtraction→"Subtract" Num SubtractFrom Num

Multiplication→"Multiply" Num MultiplyWith Num

Division→"Divide" Num DivideBy Num
    "Divide" Num DivideWith Num

Compute→"Compute" ComputeExpr

. . . and so on. The topics in this example extend only one level into the grammar, but complex grammars may use this approach to divide the language they define into various subsets. It should be noted that some, but not necessarily all non-terminal symbols are topics. The start symbol is required to be a topic. Any other non-terminal symbol B can be a topic if, in the grammar, there exists a rewrite rule:

A::=B, and A is also a topic.

A preferred embodiment of the present invention, a "What Can I Say" (WCIS) window, gives a user the ability to view the topics of the various grammars associated with the applications which are active in a speech recognition system. Each application grammar which is registered with the system contains information regarding how to display itself in the WCIS window. The WCIS provides to the user visual indication of allowable vocabulary and usage, including words, phrases and sentences.

As a preliminary matter, it is noted that the complete WCIS window is not intended to be displayed at all times. The amount of information available to and processed by the WCIS demands considerable system computational resources. Moreover, the amount of information displayed requires significant display screen space. As a result, the continuous display of the entire WCIS is impractical, and the WCIS window acts like a dialog box in that it is only temporarily displayed when invoked by the user.

A preferred embodiment, as shown in FIG. 1, includes a WCIS window 10 which occupies a portion of the display screen. At the top of the WCIS window 10, FIG. 1 shows a grammar identifier 12 which contains a grammar topic control that allows the user to interactively select an active grammar. The grammar identifier 12 uses a drop-down menu list to alphabetically display all the grammars. In addition, one level of depth into each grammar may be displayed in the grammar identifier 12. For instance, the grammar identifier 12 may contain grammars for all active commands (a superset of all active command sets), global commands that are active anywhere within the speech application, for various word-processors, for general menu navigation, e-mail applications, etc.

Since the grammars may include large, complex natural language grammars, the WCIS 10 provides multiple operating modes, including word-by-word search, example search, tree search, and all-words list. Display pages associated with the various operating modes are contained in a WCIS Search Tab Control which displays a search identifier 14. The search identifier 14 describes various available grammar search modes for determining currently valid inputs according to the active grammar.

A current input 16 is also displayed within the WCIS 10 which describes a current spoken input. Below the current input 16 is the valid grammar list 18 which lists examples of valid vocabulary and usage according to the grammar search mode for the active grammar. Typically, the examples in the valid grammar list 18 are also constrained by the current input 16.

Operation of the WCIS 10 varies depending on the search mode selected and displayed in the search identifier 14. Tree search presents the user with a visual display of the active grammar starting from the current input 16. The active grammar is displayed in the valid grammar list 18. The user can expand the topics in the valid grammar list 18 to see deeper into the grammar. Working deeper into the grammar through the valid grammar list 18 also changes the current input 16 display. By manipulating the search tree, the user can see how the current input 16 changes. The display of the topics in the valid grammar list 18 may include use of ellipses after topics which are continuable and a "X" mark before the topic to indicate the topic is a partial form of a valid topic and a "√"0 mark before the topic to indicate that it is a complete. form of a valid topic.

Selecting example search with the search identifier 14 generates examples of valid vocabulary and usage contained in the currently selected topic as shown in the current input 16. The user can limit the example search by inputting keywords that the generated sentences must contain. For example, clicking on the "Addition" topic will generate sentences like "Add three and five", "Add four to ten", and "Add seventy three with two hundred and eight." However, typing "and" into the keyword field will limit the generated examples to "Add three and five" and "Add seventy three with two hundred and eight." "Add four to ten" would not be generated: The user can control the number of examples generated and this enter of search is limited to the topic selected in the grammar topic control.

Word-by word search allows the user to build a valid sentence by selecting from a list of start words, and then from words that follow what is already present. Alternatively, the user can enter a sentence to check if it is valid. As the user enters a sentence, all the valid next words are displayed below the search window in a list box. The search is limited to the topic selected in the grammar topic control.

Other search and display forms are also possible. All-words list displays all the words in the grammar. In addition, a WCIS window can display a dictation grammar window. This dictation grammar window has a single dictation topic in the grammar topic control and it does not have any sub-topics. When the user selects the dictation topic with the topic selector, the list box displays the dictation words, and the user can search the dictation grammar for valid vocabulary.

The examples displayed in the WCIS are produced by stochastic generation. From the start symbol, grammar rules are chosen at random to generate a random valid parse tree in which the terminal symbols form the generated sentence. Such stochastic generation algorithms are well-known in the art.

To generate example sentences with a single keyword, a rule is chosen with the keyword somewhere on the right hand side. Then, the grammar is recursively processed back to get to a rule that has the start symbol on the left hand side, saving all the parse tree information. This produces a partial parse tree with non-terminal symbols as leaves of the parse tree. The non-terminals are filled in using the plain stochastic generator described above, using the non-terminal in question as the start symbol. For generation of sentences with more than one keyword, many sentences are generated using the single keyword technique. Then all the examples that do not have all the keywords are discarded.

To bias the generated example sentences toward shortness, the grammar is converted into a matrix. A square matrix M is initialized which is composed of integers with zero in every cell. The square matrix has as many rows and columns as there are non-terminal symbols in the grammar. For each time that a non-terminal symbol <j> appears on the RHS of a rewrite rule, take that rule's LHS non-terminal symbol <i> and add one to the matrix cell M(i,j). Then, for each time a non-terminal symbol <i> appears on the LHS of any rewrite rule, subtract one from the diagonal M(i,j).

The matrix is then solved as a set of linear equations using one of the well-known matrix diagonalization methods. When the system is solved, a diagonal matrix is obtained wherein all the values are positive on the diagonal cells and zero elsewhere. Then, for each rule, an average generated example length is determined by summing over the symbols on the RHS where each terminal symbol has a value of 1 and each non-terminal symbol has the value indicated in the square matrix M(i,j). This average generated example length is used to bias the stochastic generator to improve the usefulness of the example sentences generated by the WCIS. Otherwise, the examples may tend to be overly long and hard to understand.

One of the biggest problems with a natural language user interface which does not contain all of natural English is that the user may try to say something that is not defined by the grammar. The WCIS window gives the user access to application grammar searching capabilities alongside the normal correction mechanism, so the user can determine if what they are trying to say is valid, and if it is not, what they can say to accomplish the desired task. As the user enters a sentence, a list box below the edit field displays possible completions to the keystrokes already entered. The user can double-click or say "take" to replace what they have entered with a specific completion. The completions take into account both the dictation grammar and the Application grammar. As a user enters a word, the system will gather all the individual words in both dictation and the Application grammar that begin with the letters entered. If the letters entered complete a word in the Application grammar, the system will display all the words that can come after the entered word and still be part of a valid sentence.

The following examples show what would be displayed as the user enters:

Current sentence: b
1. baby
2. bath
3. bet
4. bind
5. bold
6. butter
7. bold . . .
8. boldface Current sentence: bo
1. boat
2. bold
3. bone
4. bold . . .
5. boldface . . .
6. boldtype . . .

Current sentence: bold
1. bold the . . .
2. bold this
3. bold on
4. bold off

Ellipses after a word in the list indicates that the word is an incomplete command in the Application grammar. When that word is selected, the words which follow it are listed below it. The use of bold, italics, color, etc. may be incorporated into this list box as needed to clarify things such as actions, commands and dictation words.

In addition, any valid sentence displayed in the WCIS window is trainable. That is, the user can provide examples or tokens of the user speaking the sentence which the speech recognition system integrates into the recognition engine. Right-clicking on the sentence brings up a context menu with a selection for training the sentence. The user can also train an item on the grammar topic control of the WCIS window. Clicking on "train" on the context menu will allow the user to perform training on randomly generated sentences within the selected topic.

The WCIS window also allows for editing of client grammars. However, the grammars are not owned by the speech recognition engine with the WCIS window, but rather are part of the speech applications programming interface (SAPI) client associated with the grammar. Therefore, the grammars cannot be directly edited by the WCIS, but must be edited indirectly by the WCIS. When a SAPI client registers a grammar with the speech recognition engine, the client provides information as to how that grammar is edited by specifying which of the WCIS's standard edit methods (Add, Edit, Delete, Explore, Properties, etc.) are valid. When the user right-clicks on a grammar in WCIS, the system checks to see what edit modes that grammar supports. Any supported methods are reflected in the context menu that is displayed as a result of the mouse click. When the user clicks on one of these methods, WCIS notifies the SAPI client of the requested modification through an appropriate notify sink. The client can then pop up an appropriate dialog box or perform appropriate actions.

What is claimed is:

1. A graphical user interface for use in a speech recognition system, for user interaction with at least one grammar of valid vocabulary and usage for an application that is accessible to the speech recognition system, the interface comprising:
   an interactive dialog box in a portion of a display screen;
   a grammar identifier displayed within the dialog box which describes an active grammar;
   a search identifier displayed within the dialog box which describes a grammar search mode for determining valid inputs according to the active grammar;
   a current input displayed within the dialog box which describes a spoken input; and
   a valid grammar list displayed within the dialog box which lists examples of valid vocabulary and usage according to the grammar search mode for the active grammar.

2. A graphical user interface as in claim 1, wherein the active grammar is interactively selectable using the dialog box.

3. A graphical user interface as in claim 1, wherein the grammar search mode is interactively selectable using the dialog box.

4. A graphical user interface as in claim 1, wherein one of the examples displayed in the valid grammar list is interactively selectable as an input to the application of the active grammar.

5. A graphical user interface as in claim 1, wherein the grammar search mode determines all word phrases of at least one word which are valid in the active grammar.

6. A graphical user interface as in claim 1, wherein the grammar search mode determines word phrases of at least one word which contain the current input and which are valid in the active grammar.

7. A graphical user interface as in claim 6, wherein the word phrases begin with the current input.

8. A graphical user interface as in claim 1, further including an active grammar display within the dialog box which displays the active grammar.

9. A graphical user interface as in claim 8, wherein the current input is interactively selectable using the active grammar display.

10. A graphical user interface as in claim 1, wherein the examples displayed in the valid grammar list are biased towards shortness by use of a matrix-based algorithm.

11. A graphical user interface as in claim 10, wherein the matrix-based algorithm determines an average generated example length to bias the examples towards shortness.

12. A graphical user interface as in claim 1, wherein the valid vocabulary includes a set of commands applicable to the application.

13. A method of user interaction via a graphical user interface with at least one grammar of valid vocabulary and usage for an application accessible to a speech recognition system, the method comprising:
   creating an interactive dialog box in a portion of a display screen;
   displaying within the dialog box:
      a grammar identifier which describes an active grammar,
      a search identifier which describes a grammar searching mode for determining valid inputs according to the active grammar, and
      a current input which describes a spoken input; and
   generating and displaying within the dialog box a valid grammar list which lists examples of valid vocabulary and usage according to the grammar search mode for the active grammar.

14. A method as in claim 13, wherein the active grammar is interactively selected using the dialog box.

15. A method as in claim 13, wherein the grammar search mode is interactively selected using the dialog box.

16. A method as in claim 13, wherein the method further includes selecting one of the examples displayed in the valid grammar list as an input to the application of the active grammar.

17. A method as in claim 13, wherein the grammar search mode determines all word phrases of at least one word which are valid in the active grammar.

18. A method as in claim 13, wherein the grammar search mode determines word phrases of at least one word which contain the current input and which are valid in the active grammar.

19. A method as in claim 18, wherein the word phrases begin with the current input.

20. A method as in claim 13, wherein the step of displaying within the dialog box further includes displaying the active grammar.

21. A method as in claim 20, wherein the current input is interactively selected using the display of the active grammar.

22. A method as in claim 13, wherein the examples displayed in the valid grammar list are biased towards shortness by use of a matrix-based algorithm.

23. A method as in claim 22, wherein the matrix-based algorithm determines an average generated example length to bias the examples towards shortness.

24. A method as in claim 13, wherein the valid vocabulary includes a set of commands applicable to the application.

* * * * *